US005790880A

United States Patent [19]

Ireton

[11] Patent Number: 5,790,880
[45] Date of Patent: Aug. 4, 1998

[54] MICROPROCESSOR CONFIGURED TO DYNAMICALLY CONNECT PROCESSING ELEMENTS ACCORDING TO DATA DEPENDENCIES

[75] Inventor: Mark A. Ireton, Austin, Tex.

[73] Assignee: Advanced Micro Devices, Sunnyvale, Calif.

[21] Appl. No.: 583,157

[22] Filed: Jan. 4, 1996

[51] Int. Cl.$^6$ ........................................... G06F 7/00
[52] U.S. Cl. ............... 395/800.23; 395/566; 395/394; 395/800.43; 395/562; 395/800.36
[58] Field of Search ............... 395/800.23, 800.36, 395/800.43, 562, 566, 394, 391, 389

[56] References Cited

U.S. PATENT DOCUMENTS

| | | | |
|---|---|---|---|
| 4,553,203 | 11/1985 | Rau et al. | |
| 5,361,367 | 11/1994 | Fijany et al. | 395/800 |
| 5,560,028 | 9/1996 | Sachs et al. | 395/800.23 |
| 5,564,056 | 10/1996 | Fettermen et al. | 395/800.23 |
| 5,649,138 | 7/1997 | Ireton | 395/393 |
| 5,655,133 | 8/1997 | Dupree et al. | 395/800.23 |

OTHER PUBLICATIONS

Superscaler Microprocessor Design, Mike Johnson, Prentice Hall, Englewood cliffs, NJ (1991), pp. 122–125.
Corporaal, H., et al., "Move: A Framework for High–Performance Processor Design," Proceedings of the Supercomputing Conference, Albuquerque, Nov. 18–22, 1991, No. Conf. 4, Institute of Electrical and Electronics Engineers, pp. 692–701.

Razdon et al. "A High–Performance Micro Architecture with Hardware–Programmable Functional Units" 1994.

*Primary Examiner*—Larry D. Donaghue
*Attorney, Agent, or Firm*—Conley, Rose & Tayon; B. Noel Kivlin

[57] ABSTRACT

A microprocessor is provided which detects dependencies among instructions. The microprocessor assigns each instruction to a processing element or elements which perform the operation specified by the instruction. Additionally, the microprocessor is configured to dynamically alter the interconnect between the processing elements such that dependent operations receive operands from the operations upon which they depend. In particular, an instruction which computes a result upon which another instruction depends is connected to provide the result to that instruction. Routing of data between processing elements is determined prior to the execution of the instructions. Using the dynamic reconfiguration of interconnections, the microprocessor executes instruction sequences more efficiently than a DSP which is optimized for another instruction sequence. Because the connections are reconfigurable, the microprocessor may be configured for the efficient execution of many different instruction sequences (as opposed to the limited number imposed by typical DSPs).

16 Claims, 4 Drawing Sheets

MICROPROCESSOR CONFIGURED TO DYNAMICALLY CONNECT PROCESSING ELEMENTS ACCORDING TO DATA DEPENDENCIES

BACKGROUND OF THE INVENTION

1. Field of the Invention

This invention is related to the field of microprocessors and, more particularly, to a microprocessor configured to detect data dependencies between instructions prior to instruction execution and to configure an interconnect between processing elements according to the data dependencies.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system. An exemplary DSP is the ADSP 2171 available from Analog Devices, Inc. of Norwood, Mass.

Microprocessors often include one or more execution units which are configured to perform basic arithmetic/logic operations. Instructions sets employed by microprocessors typically contain instructions specifying that one of these basic arithmetic/logic operations be performed upon one or more source operands, and that the result be stored in a particular destination. As used herein, the term "source operand" refers to a value operated upon in response to an instruction. The value is typically used as an input to the operation. A "destination operand" or "destination" identifies a location for storing the result of the operation. Since the microprocessor executes basic operations, a large number of instructions are required to execute complex mathematical algorithms. These types of operations are therefore executed rather inefficiently by microprocessors.

Conversely, DSPs are typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations.

In order to perform these systematic arithmetic/multiplicative algorithms efficiently, DSPs often include hardware arithmetic/logic units, multipliers, accumulators, etc. These hardware units are then often connected such that the output of one of the hardware units may directly feed the inputs of the other hardware units. Instructions within the instruction set of the DSP often allow for specification of a number of these hardware units to be used to perform an operation. For example, a particular instruction may specify the multiplication of two source operands followed by an addition of the product and a third operand. However, the flexibility for specifying different combinations of operations is limited by the length of the instruction (i.e. the more variations which are allowed, the larger the number of bits which must be included within instructions to uniquely encode each variation). Because larger instructions occupy more memory and may not always be fully utilized, DSP designers must often choose a limited number of allowable combinations in order to retain a reasonably sized instruction. As a consequence, certain operations are performed efficiently by a particular DSP while other operations are less efficient. A microprocessor architecture which may efficiently execute many different types of complex algorithms without incurring the instruction length difficulties common to DSPs is desired.

SUMMARY OF THE INVENTION

The problems outlined above are in large part solved by a microprocessor in accordance with the present invention. The microprocessor is configured to detect dependencies among instructions. The microprocessor assigns each instruction to a processing element or elements which perform the operation specified by the instruction. Additionally, the microprocessor is configured to dynamically alter the interconnect between the processing elements such that dependent operations receive operands from the operations upon which they depend. In particular, an instruction which computes a result upon which another instruction depends is connected to provide the result to the processing element which executes that instruction. Advantageously, routing of data between processing elements is determined prior to the execution of the instructions.

Using the dynamic reconfiguration of interconnections, the present microprocessor executes instruction sequences more efficiently than a DSP which is optimized for another instruction sequence. Because the connections are reconfigurable, the microprocessor may be configured for the efficient execution of many different instruction sequences (as opposed to the limited number imposed by typical DSPs). Additionally, instruction length may be minimized. Instructions may specify an operation which is performed by a particular processing element, instead of specifying multiple operations to be performed by multiple processing elements. The instructions may have dependencies upon other instructions within an instruction sequence. The microprocessor then links the processing elements such that the instruction sequence is efficiently performed. Advantageously, the microprocessor may perform complex algorithms efficiently, but does not suffer from the large instructions common to the DSP.

Broadly speaking, the present invention contemplates a microprocessor comprising an instruction cache, a control unit, a data interconnect, and a plurality of processing elements. The instruction cache is configured to store a plurality of instructions. Coupled to receive the plurality of instructions from the instruction cache, the control unit is configured to detect dependencies between respective ones of the plurality of instructions prior to execution of the plurality of instructions. Additionally, the control unit is configured to provide a plurality of control signals upon a control bus. The data interconnect is coupled to the control bus, and comprises a plurality of operand buses. Coupled to the plurality of operand buses, the plurality of processing elements comprise a plurality of result buses. Furthermore, the plurality of processing elements are configured to perform at least one processing operation upon values conveyed upon the plurality of operand buses and to convey results of the processing operations upon the plurality of result buses. The data interconnect is coupled to the plurality of result buses, and is configured by the control signals prior to execution of the plurality of instructions to route results conveyed upon the plurality of result buses upon the plurality of operand buses. The routing is performed such that a result of a first of the plurality of instructions is routed to a source operand of a second of the plurality of instructions dependent upon the first of the plurality of instructions.

The present invention further contemplates a method for dynamically configuring a plurality of processing elements to execute a plurality of instructions, comprising several steps. A plurality of instructions are fetched from an instruction cache. Each one of the plurality of instructions is assigned to at least one of the plurality of processing elements. A dependency is detected between a first one of the plurality of instructions and a second one of the plurality of instructions. A data interconnect is then configured. The data interconnect connects output buses of the plurality of processing elements to input buses of the plurality of processing elements. Configuration of the data interconnect is performed such that an output bus of a first one of the plurality of the processing elements is connected to an input bus of a second one of the processing elements. The first processing element receives the first one of the plurality of instructions and the second one of the plurality of processing elements receives the second one of the plurality of instructions. Finally, the plurality of instructions is executed subsequent to the configuration.

BRIEF DESCRIPTION OF THE DRAWINGS

Other objects and advantages of the invention will become apparent upon reading the following detailed description and upon reference to the accompanying drawings in which.

Figure 1:
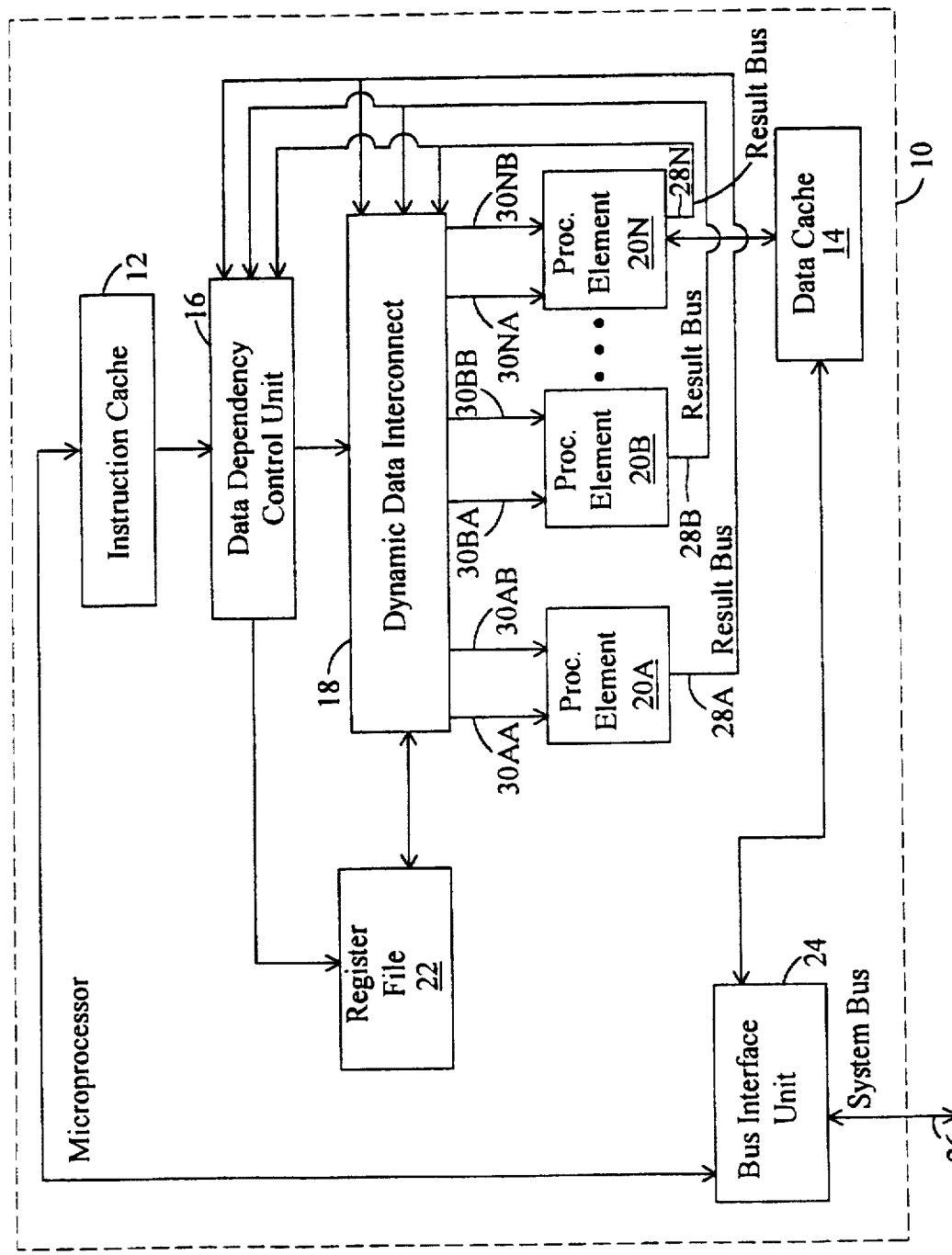
FIG. 1 is a block diagram of a microprocessor including a data dependency control unit and a dynamic data interconnect.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 may be the central processing unit of a computer system, or may be used as a coprocessor such as a DSP. Microprocessor 10 includes an instruction cache 12, a data cache 14, a data dependency control unit 16, a dynamic data interconnect 18, a plurality of processing elements 20A–20N, a register file 22, and a bus interface unit 24. Plurality of processing elements 20A–20N will be collectively referred to herein as processing elements 20. Bus interface unit 24 is coupled to data cache 14, instruction cache 12, and a system bus 26. Instruction cache 12 is further coupled to data dependency control unit 16. Data dependency control unit 16 is coupled to register file 22, dynamic data interconnect 18, and a plurality of result buses 28A–28N. Also coupled to result buses 28 is dynamic data interconnect 18, which is further coupled to register file 22 and to processing elements 20 through a plurality of source operand buses 30AA–30NB. Finally, processing element 20N is coupled to data cache 14. It is noted that other processing elements 20 may also be coupled to data cache 14.

Generally speaking, data dependency control unit 16 is configured to detect dependencies among instructions fetched from instruction cache 12. A "dependency" exists between a first instruction and a second instruction if the result of executing the first instruction is a source operand for the second instruction. Data dependency control unit 16 assigns each instruction to a processing element or elements 20 which perform the operation specified by the instruction. Furthermore, data dependency control unit 16 causes dynamic data interconnect 18 to form a connection between processing elements 20 which receive instructions for which dependencies are detected. In particular, a result bus 28 which conveys the result of the instruction upon which another instruction depends is connected to an appropriate source operand bus 30. In this manner, an instruction receives its operands from another instruction upon which that instruction depends. Advantageously, routing of data between processing elements is determined prior to the corresponding instruction execution.

Processing elements 20 become interconnected as suggested by the data dependencies within a particular instruction sequence via dynamic reconfiguration of the connections between processing elements 20. The reconfiguration is performed prior to the execution of the particular instruction sequence. The instruction sequence may thereby be executed more efficiently by microprocessor 10 than by a DSP which is optimized for another instruction sequence. Because the connections are reconfigurable, microprocessor 10 may be configured for the efficient execution of many different instruction sequences as opposed to the limited number imposed by typical DSPs. Additionally, instruction length may be held to a minimum. Instructions may specify an operation performed by one processing element 20. The instructions may have dependencies upon other instructions. Data dependency control unit 16 and dynamic data interconnect 18 link processing elements 20 such that the instruction sequence is efficiently performed.

If a source operand is independent of other instructions within the instruction sequence, the source operand is requested from register file 22 by data dependency control unit 16. Results of performing instructions are routed from result buses 28 to register file 22 by dynamic data interconnect 18. Register file 22 includes storage for registers defined by the instruction set of microprocessor 10. For example, the x86 microprocessor architecture includes the EAX, EBX, ECX, EDX, ESP, EBP, ESI, and EDI registers.

Processing elements 20 are configured to perform a processing operation. Processing operations may include multiplication, accumulation, and arithmetic/logic operations. Additionally, processing operations may include transferring values to and from memory. Processing element 20N is shown connected to data cache 14 for performing memory accesses such as load and store operations. Load operation results are conveyed upon result bus 28N to dynamic data interconnect 18. Processing elements 20 receive source operands upon source operands buses 30, and results are conveyed upon a result bus 28. Although processing elements 20 are each shown with two source operand buses 30 and one result bus 28. other embodiments of processing elements 20 may include more or fewer of each type of bus. Such processing elements may individually perform more complicated operations such as the multiply-accumulate function typical of DSP algorithms. It is noted that additional processing elements 20 may be coupled to data cache 14 for performing load and store memory operations.

In one embodiment, data dependency control unit 16 stores indications of instructions previously fetched from instruction cache 12 but which have not yet been performed by a processing element 20. In this manner, data dependencies may be detected between instructions fetched at dissimilar times. Data dependency control unit 16 is coupled to result buses 28 in order to detect when instructions have been executed. The corresponding indications are thereby discarded when the instruction is performed.

Instruction cache 12 is a high speed cache memory for storing instructions. Instructions are fetched from instruction cache 12 and conveyed to data dependency unit 16 for execution. Instruction cache 12 may be configured into a set-associative or direct-mapped configuration. Similarly, data cache 14 is a high speed cache memory for storing data and may be configured into a set-associative or direct-mapped configuration.

Bus interface unit 24 is configured to effect communication between microprocessor 10 and devices coupled to system bus 26. For example, instruction fetches which miss instruction cache 12 may be transferred from main memory by bus interface unit 24. Similarly, data requests performed by processing element 20N which miss data cache 14 may be transferred from main memory by bus interface unit 24. Additionally, data cache 14 may discard a cache line of data which has been modified by microprocessor 10. Bus interface unit 24 transfers the modified line to main memory.

Figure 2:
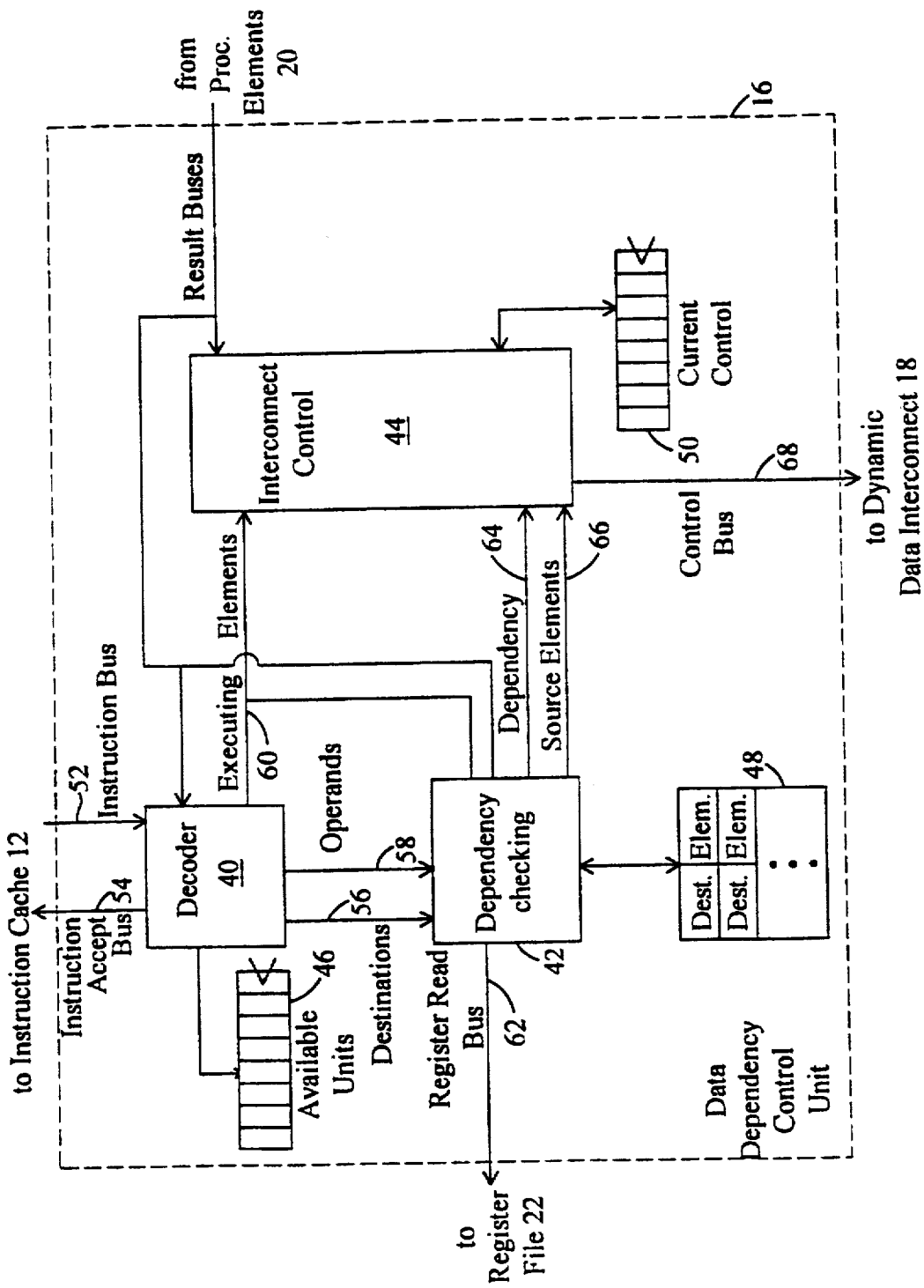
FIG. 2 is a block diagram of one embodiment of the data dependency control unit shown in FIG. 1.

Turning next to FIG. 2, a block diagram of one embodiment of data dependency control unit 16 is shown. Data dependency control unit 16 includes a decoder 40, a dependency checking unit 42, an interconnect control unit 44, an available units storage 46, a dependency storage 48, and a current control storage 50. Decoder 40 is coupled to an instruction bus 52 and an instruction accept bus 54 from instruction cache 12. Additionally, decoder 40 is coupled to available units storage 46, a destinations bus 56, an operands bus 58, result buses 28, and an executing elements bus 60. Dependency checking unit 42 is coupled to destinations bus 56, operands bus 58, a register read bus 62, a dependency bus 64, a source elements bus 66, result buses 28, and dependency storage 48. Interconnect control unit 44 is coupled to current control storage 50, result buses 28, executing elements bus 60, dependency bus 64, source elements bus 66, and a control bus 68.

Decoder 40 receives instructions upon instruction bus 52 from instruction cache 12. Each instruction is decoded to determine which processing operation the instruction corresponds to, as well as to determine source and destination operands. Depending upon the processing operation which corresponds to the instruction, one or more of processing elements 20 may be configured to execute the instruction. If a processing element 20 is configured to execute the instruction and is not assigned to a prior instruction which has not yet executed, then decoder 40 is configured to assert a corresponding signal upon instruction accept bus 54 indicating that the instruction was accepted. If an asserted signal upon instruction accept bus 54 is not received by instruction cache 12 for a particular instruction, that instruction is retransmitted by instruction cache 12. It is noted that multiple instructions may be concurrently conveyed upon instruction bus 52. Instruction accept bus 54 includes a signal for each instruction which may be concurrently conveyed.

Available units storage 46 stores an indication of those processing elements which are available for assignment (i.e. not assigned to a previous instruction which has not yet executed). In one embodiment, available units storage 46 stores a bit corresponding to each processing element 20. If the bit is set, the corresponding processing element 20 is available. If the bit is clear, the corresponding processing element 20 is not available. For the embodiment shown, at most one instruction is associated with each processing element 20 at any given time. When decoder 40 assigns an instruction to a processing element 20, the corresponding bit in available units storage 46 is reset and remains reset until the processing element 20 conveys a result upon result buses 28. Decoder 40 selects an available processing element 20 to execute the instruction, and conveys an indication of the selected processing element to interconnect control unit 44 upon executing elements bus 60. Executing elements bus 60 is configured to concurrently convey a number of indications of processing elements equal to the number of instructions which may be concurrently conveyed from instruction cache 12.

In addition to assigning an instruction to a processing element 20, decoder 40 detects the source and destination operands for the instructions. The source operands are conveyed upon source operands bus 58, while the destination operands are conveyed upon destination operands bus 56. Dependency checking unit 42 receives the source and destination operands. The source operands for each instruction are compared to the destination operands of instructions prior to that instruction in program order. If a source operand is a destination of a prior instruction, then dependency checking unit 42 asserts a corresponding signal upon dependency bus 64 to interconnect control unit 44. The processing element which produces the source operand as a result is indicated to interconnect control unit 44 via a value upon source elements bus 66. Dependency bus 64 includes signals corresponding to each source operand of each instruction which may be concurrently conveyed to data dependency control unit 16. Similarly, source elements bus 66 may convey a number of values equal to the number of dependency signals upon dependency bus 64. Each dependency signal corresponds to a particular value upon source elements bus 66.

Because instructions prior to a particular instruction in program order may be fetched prior to that particular instruction, dependency checking unit 42 also performs dependency checking upon instructions outstanding within microprocessor 10. Dependency storage 48 is included for allowing such functionality. For each instruction processed by data dependency control unit 16, a storage location within dependency storage 48 is allocated. Within each storage location is the processing element which is assigned to the instruction (received upon executing elements bus 60 when the instruction is processed) and the destination operand of that instruction. Dependency checking unit 42 compares each of the indications stored within dependency storage 48 to instructions being processed. If a dependency is detected, the dependency is handled similar to the above discussion for dependencies between concurrently fetched instructions.

If dependency checking unit 42 does not detect a dependency for a particular source operand, the source operand is stored in register file 22. An indication of the register is conveyed upon register read bus 62, which is coupled to register file 22. The value stored within the indicated register is then conveyed to dynamic data interconnect 18. Due to the corresponding dependency signal being deasserted, interconnect control unit 44 may detect that the operand value is provided by register file 22. Control signals asserted by interconnect control unit 44 cause the register value to be transferred to the processing element 20 assigned to the instruction.

Dependency checking unit 42 stores destinations and assigned processing elements in dependency storage 48 until the processing element 20 conveys a result upon a corresponding result bus 28. Upon detecting a result being conveyed upon result bus 28, dependency checking unit 42 deletes information corresponding to the processing element from dependency storage 48.

Upon receipt of an asserted dependency signal, interconnect control unit 44 generates appropriate control signals upon control bus 68 to connect processing elements 20. The processing element 20 indicated upon source elements bus 66 is referred to as the source processing element. The processing element 20 indicated upon executing elements bus 60 is referred to as the receiving processing element. Control signals cause the formation of connections between the result bus 28 corresponding to the source processing element and one of the operands buses 30 corresponding to the receiving processing element. For example, processing element 20B may be selected to execute an instruction and the instruction may have a dependency upon the result of processing element 20A. An indication of processing element 20B is conveyed upon executing elements bus 60. An indication of processing element 20A is conveyed upon source elements bus 66, and the corresponding dependency signal is asserted upon dependency bus 64. Interconnect control unit 44 therefore asserts control signals upon control bus 68 which cause result bus 28A to be connected to source operands bus 30BA or 30BB, depending upon which of the instruction's operands is dependent upon the result of processing element 20A.

Control signals forming a connection between a particular result bus 28 and a particular source operand bus 30 remain asserted until a result is conveyed upon the particular result bus 28. Current control storage 50 stores the set of control signals asserted by interconnect control unit 44 during a clock cycle. Interconnect control unit 44 asserts control signals which were previously asserted until the source processing element associated with the control signals conveys a result upon result buses 28. By storing the asserted control signals in current control storage 50, the control signals corresponding to previously processed instructions may be maintained.

Figure 3:
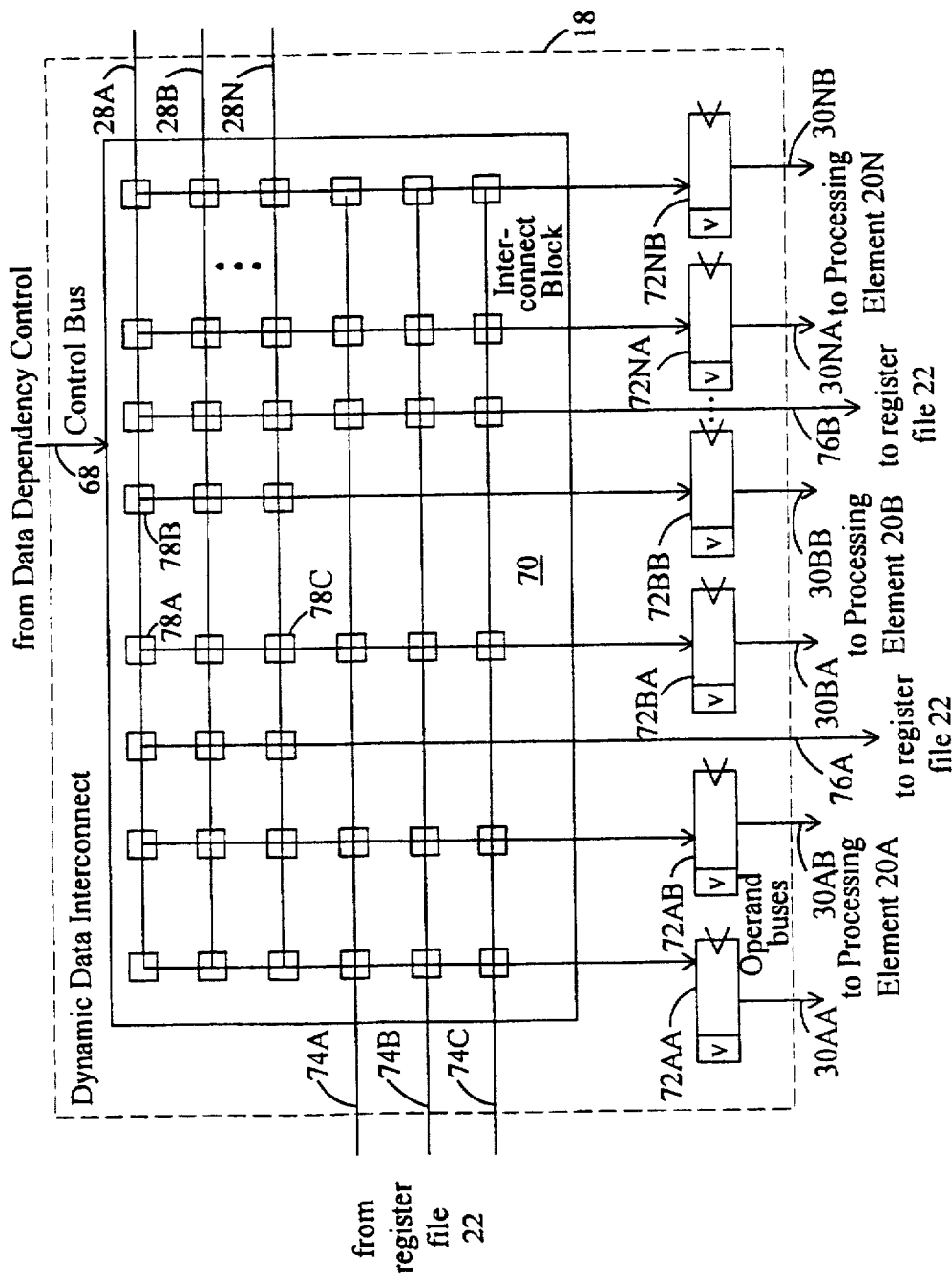
FIG. 3 is a block diagram of one embodiment of the dynamic data interconnect shown in FIG. 1.

Turning next to FIG. 3, a diagram of one embodiment of dynamic data interconnect 18 is shown. As shown in FIG. 3, dynamic data interconnect 18 includes an interconnect block 70 and a plurality of operand storage devices 72AA–72NB. Interconnect block 70 is coupled to control bus 68, result buses 28 from processing elements 20, and a plurality of register data buses 74A–74C from register file 22. Additionally, interconnect block 70 is coupled to each of operand storage devices 72. Operand storage devices 72 are further coupled to corresponding source operand buses 30. Finally, interconnect block 70 is coupled to a plurality of register write buses 76A–76B.

Interconnect block 70 is configured to connect any of result buses 28 or register data buses 74 to any of operand storages 72. Interconnect block 70 comprises a plurality of switches including switch 78A, 78B, and 78C. Each switch 78 is configured to connect a result bus 28 or a register data bus 74 to either an operand storage device 72 or a register write bus 76. For the embodiment shown, a control signal is included within control bus 68 for each of switches 78. If a switch 78 receives a corresponding asserted control signal, the switch connects the two buses coupled to that switch. For example, if switch 78A receives an asserted control signal, result bus 28A is coupled to a bus coupled to source operand storage 72BA.

Interconnect block 70 is often referred to as a crossbar structure. The structure shown allows for each "output" (e.g. operand storage device 72 or register write bus 76) to be connected to up to one "input" (e.g. result bus 28 or register data bus 74). Such an interconnect supports any possible connection that may be generated by data dependency control unit 16 as shown in FIG. 2. Other interconnects may be used in other embodiments of dynamic data interconnect 18.

Register data buses 74 convey register values stored within register file 22. One register data bus 74 corresponds to each one of register read buses 62 shown in FIG. 2. Register values are provided to a processing element 20 by data dependency control unit 16 conveying a register indication upon a register read bus 62, register file 22 conveying the register value associated with the register indication upon a corresponding register data bus 74, and a switch 78 connecting the corresponding register data bus 74 to the operand storage device 72 corresponding to the processing element 20.

In addition to connecting result buses 28 to operand storage devices 72, switches 78 are included within interconnect block 70 for connecting result buses 28 to register write buses 76. Since a value is not typically accessed from register file 22 and immediately stored back into register file 22, switches 78 are not included for connecting register data buses 74 to register write buses 76. Each register write bus 76 conveys an indication of the register to be stored to as well as the value to be stored. Although two register write buses 76 are shown in FIG. 3 for clarity, more register write buses 76 may be included to ensure that each result concurrently conveyed by processing elements 20 is stored into register file 22. It is noted that movement of a value from one register to another register may be performed internally by register file 22. In this manner, processing elements 20 need not be assigned to operations which involve only data movement.

Each operand storage device 72 is configured to store an operand for use by a corresponding processing element 20. In one embodiment, a valid indication is also stored. Operands may be provided for a particular instruction at different times. For example, one operand for the particular instruction may be stored within register file 22 and therefore is provided during the clock cycle in which the particular instruction is assigned to the corresponding processing element 20. The other operand may be provided by another processing element 20, and therefore may arrive during a clock cycle subsequent to the instruction being assigned to the corresponding processing element 20. By storing a valid indication within each operand storage device 72, a processing element 20 may determine that its operands have been provided and it may perform its processing operation to produce a result. In one embodiment, the valid indication comprises a bit indicative, when set, that the corresponding operand value is valid.

Continuing the example given with respect to FIG. 2, in which processing element 20B is selected to execute an instruction having a dependency upon processing element 20A, switch 78A receives an asserted control signal. Switch 78A connects result bus 28A to operand storage device 72BA. When processing element 20A completes the instruction assigned thereto and conveys a result upon result bus 28A, operand storage device 72BA receives the value. When the value is provided, the valid indication within operand storage device 72BA is set. The instruction assigned to processing element 20B may be subsequently executed, assuming operand storage device 72BB is storing a valid operand value.

In an alternative embodiment, microprocessor 10 may configure interconnect block 70 according to the dependencies detected but retain the dependent instructions for a clock cycle. In this manner, a second instruction which is dependent upon a first instruction does not occupy the assigned processing element until the data will be arriving from execution of the first instruction. This alternative may be particularly advantageous if the first and second instructions are within a loop. The loop may execute more smoothly by dispatching the first instruction during a first clock cycle, then dispatching the second instruction along with the first instruction (from the next loop iteration) during a second clock cycle. Subsequent clock cycles may then proceed, with additional iterations of the first and second instructions pipelined similar to the second clock cycle. One iteration of each instruction will execute per clock cycle from the second clock cycle forward, advantageously increasing instruction throughput. Effectively, an efficient pipeline has been created for the instructions in the loop, and the staggered dispatch of instructions into the pipeline allows each instruction to execute without delay.

In order to further illuminate the functionality of microprocessor 10, another example will be considered. For this example, two algorithms which may be used in DSP routines are shown. For purposes of this example, processing element 20A will be assumed to be a multiplier, processing element 20B will be assumed to be an ALU unit, and processing element 20C (not shown) will be assumed to be an accumulator. A first algorithm which may be used is the sum of a number of terms as shown in equation (1) below:

$$\Sigma(x-y)^2 \quad (1)$$

In order to compute a sum of terms shown in equation 1, each value of x and y is first subtracted (an ALU operation). The value produced by the ALU operation is then squared (a multiplication operation in which both operands are the value produced by the ALU operation) and the product of the multiplication added to the previously generated products. A DSP optimized for the operation given would therefore include an ALU unit coupled to receive x and y operands, the output of the ALU unit coupled to both inputs of a multiplier, and the output of the multiplier coupled to the input of an accumulator. However, such a DSP would not efficiently compute the sum of a number of terms represented by equation (2) below:

$$\Sigma x^2 - y \quad (2)$$

Equation 2 implies a multiplier coupled to receive the x operand as both input operands, the output of the multiplier coupled to an ALU unit which also receives the y operand, and then providing the output of the ALU unit to an accumulator.

Microprocessor 10 dynamically reconfigures the connection of its units to perform either the algorithm of equation (1) or equation (2) efficiently. In other words, microprocessor 10 uses its dynamic reconfiguration abilities to set up a pipeline which naturally routes data in order to perform the algorithm. Instructions may then be dispatched into the pipeline such that each instruction is executed without delays, similar to the alternative embodiment described above. When instructions performing the algorithm of equation (1) are detected, a dependency between the ALU result and both operands of the multiply operation are detected, causing result bus 28B (the ALU unit's result bus) to be connected to operand storage devices 72AA and 72AB. Additionally, a dependency between the multiplication operation and the accumulation operation is detected. Result bus 28A would thereby be connected to an operand storage device corresponding to processing element 20C.

Alternatively, upon detection of instructions performing the algorithm of equation (2), microprocessor 10 detects a dependency between the result of the multiply operation and the ALU operation. Result bus 28A is therefore connected to operand storage device 72BA. Similarly, a dependency is detected between the ALU operation and the accumulation operation. Result bus 28B is therefore connected to an operand storage device 72 corresponding to processing element 20C. Advantageously, microprocessor 10 creates an efficient interconnection for either algorithm. A program employing both the algorithms shown in equations (1) and (2) may enjoy enhanced performance when executed upon microprocessor 10 as compared to a DSP optimized for either one of the algorithms.

It is noted that the above discussion describes a microprocessor 10 which is configured to continuously update the data interconnect between processing elements. Other embodiments of microprocessor 10 may be configured to update the interconnect according to a particular block of instructions (for example, the instructions forming the body of a loop), and maintain that interconnect for the duration of the execution of the loop. Such embodiments of microprocessor 10 need not be configured to update the interconnect quickly. Instead, the interconnect may be updated prior to beginning execution of the block of instructions, and then the block of instructions is executed. Furthermore, the configuration of the interconnect may be stored such that, if the block of instructions is executed again at a later time, the configuration may already be determined. The configuration would then be applied to the interconnect without having to process the instructions for dependencies. The storage mechanism may be similar to a branch prediction mechanism. Branch prediction mechanisms often store the predicted target address in a storage device, such that the address of the instructions including the associated branch instruction causes the predicted target address to be read from the storage device. The configuration of the interconnect may be similarly stored into a storage device. The address of the instructions which create the configuration may then read that configuration from the storage device.

Figure 4:
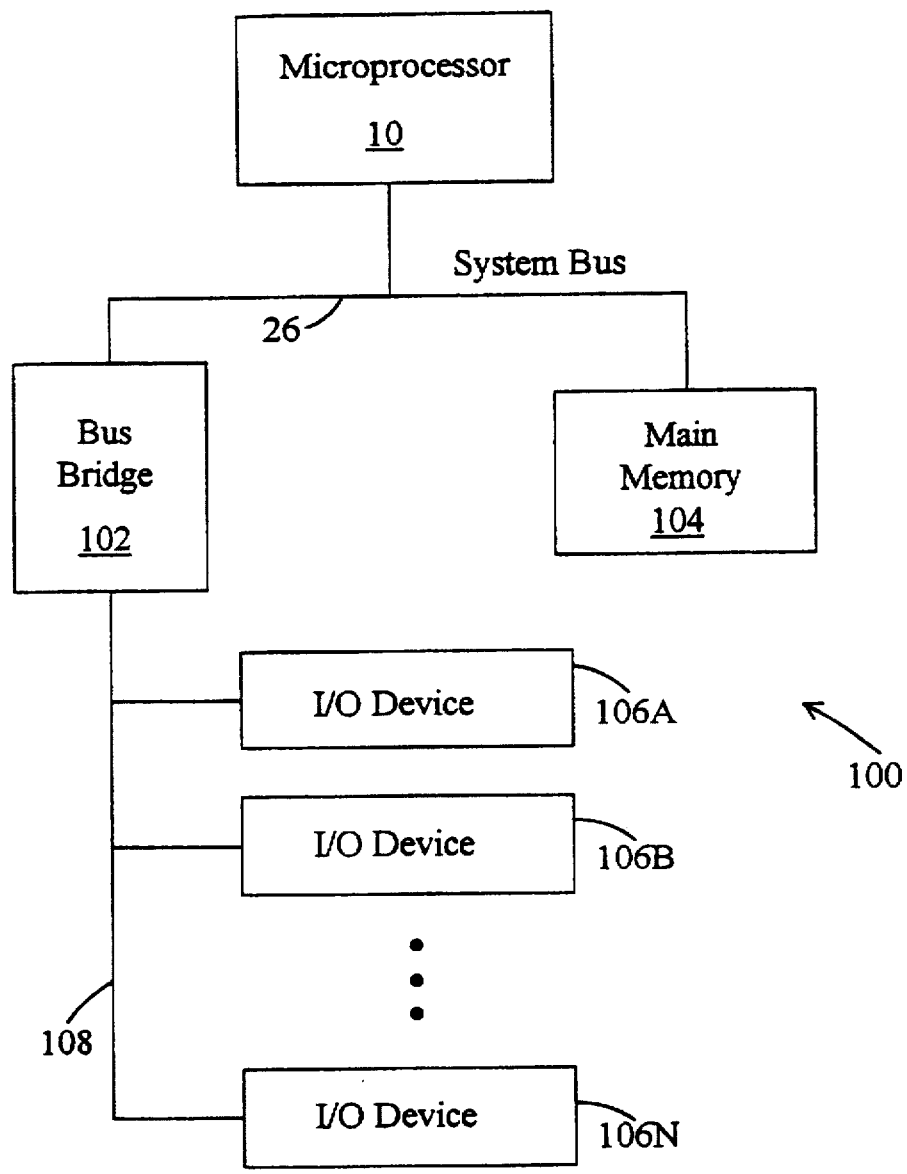
FIG. 4 is a block diagram of a computer system including the microprocessor shown in FIG. 1.

Turning now to FIG. 4, a computer system 100 including microprocessor 10 is shown. Computer system 100 further includes a bus bridge 102, a main memory 104, and a plurality of input/output (I/O) devices 106A–106N. Plurality of I/O devices 106A–106N will be collectively referred to as I/O devices 106. Microprocessor 10, bus bridge 102, and main memory 104 are coupled to system bus 26. I/O devices 106 are coupled to an I/O bus 108 for communication with bus bridge 102.

Bus bridge 102 is provided to assist in communications between I/O devices 106 and devices coupled to system bus 26. I/O devices 106 typically require longer bus clock cycles than microprocessor 10 and other devices coupled to system bus 26. Therefore, bus bridge 102 provides a buffer between system bus 26 and input/output bus 108. Additionally, bus bridge 102 translates transactions from one bus protocol to another. In one embodiment, input/output bus 108 is an Enhanced Industry Standard Architecture (EISA) bus and bus bridge 102 translates from the system bus protocol to the EISA bus protocol. In another embodiment, input/output bus 108 is a Peripheral Component Interconnect (PCI) bus and bus bridge 102 translates from the system bus protocol to the PCI bus protocol. It is noted that many variations of system bus protocols exist. Microprocessor 10 may employ any suitable system bus protocol.

I/O devices 106 provide an interface between computer system 100 and other devices external to the computer system. Exemplary I/O devices include a modem, a serial or parallel port, a sound card, etc. I/O devices 106 may also be referred to as peripheral devices. Main memory 104 stores data and instructions for use by microprocessor 10. In one embodiment, main memory 104 includes at least one Dynamic Random Access Memory (DRAM) and a DRAM memory controller.

It is noted that although computer system 100 as shown in FIG. 4 includes one microprocessor, other embodiments of computer system 100 may include multiple microprocessors similar to microprocessor 10. Similarly, computer system 100 may include multiple bus bridges 102 for translating to multiple dissimilar or similar I/O bus protocols. Still further, a cache memory for enhancing the performance of computer system 100 by storing instructions and data referenced by microprocessor 10 in a faster memory storage may be included. The cache memory may be inserted between microprocessor 10 and system bus 26, or may reside on system bus 26 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a microprocessor has been described which includes a dynamically reconfigurable interconnect between its processing elements. The interconnect may be configured to efficiently pass the result of one processing element to another processing element which depends upon the result according to an instruction sequence being executed. Upon occurrence of another instruction sequence, a different interconnect may be generated. Advantageously, the microprocessor may be more efficient at executing instruction sequences than DSPs which have a hardwired interconnect between processing elements.

Numerous variations and modifications will become apparent to those skilled in the art once the above disclosure is fully appreciated. It is intended that the following claims be interpreted to embrace all such variations and modifications.

What is claimed is:

1. A microprocessor comprising:

an instruction cache configured to store a plurality of instructions;

a control unit coupled to receive said plurality of instructions from said instruction cache, wherein said control unit is configured to detect dependencies between respective ones of said plurality of instructions prior to execution of said plurality of instructions and to provide a plurality of control signals upon a control bus;

a data interconnect coupled to said control bus, wherein said data interconnect comprises a plurality of operand buses; and a plurality of processing elements coupled to said plurality of operand buses, wherein said plurality of processing elements comprise a plurality of result buses, and wherein said plurality of processing elements are configured to perform at least one processing operation upon values conveyed upon said plurality of operand buses and to convey results of said processing operations upon said plurality of result buses;

wherein said data interconnect is coupled to said plurality of result buses, and wherein said data interconnect is configured by said control signals prior to dispatch of said plurality of instructions to route results conveyed upon said plurality of result buses upon said plurality of operand buses such that a result of a first of said plurality of instructions is routed to a source operand of a second of said plurality of instructions dependent upon said first of said plurality of instructions.

2. The microprocessor as recited in claim 1 wherein processing operations comprise multiplication, accumulation, and arithmetic/logic operations.

3. The microprocessor as recited in claim 1 wherein said data interconnect comprises a crossbar coupled to connect each of said plurality of result buses to each of said plurality of operands buses, and wherein specific connections are made according to said plurality of control signals.

4. The microprocessor as recited in claim 3 further comprising a register file coupled to said control unit and said data interconnect, wherein said register file is configured to store results corresponding to a plurality of registers.

5. The microprocessor as recited in claim 4 wherein said control unit further comprises a plurality of register read buses coupled to said register file, and wherein said control unit is configured to convey values indicative of particular ones of said plurality of registers upon said plurality of register read buses, and wherein said particular ones of said plurality of registers correspond to source operands of said plurality of instructions.

6. The microprocessor as recited in claim 5 wherein said register file further comprises a plurality of register data buses coupled to said data interconnect, wherein said register data buses convey values stored within said particular ones of said plurality of registers, and wherein said data interconnect is configured to route said values conveyed upon said register data buses upon said plurality of operand buses in accordance with said plurality of control signals.

7. The microprocessor as recited in claim 4 wherein said data interconnect further comprises a plurality of register write buses coupled to said register file, and wherein said data interconnect is configured to transmit results conveyed upon said plurality of result buses upon said plurality of register write buses in accordance with said plurality of control signals.

8. The microprocessor as recited in claim 7 wherein said register file is configured to store results conveyed upon said plurality of register write buses into certain ones of said plurality of registers.

9. The microprocessor as recited in claim 1 wherein said control unit comprises:

a decoder coupled to receive said plurality of instructions from said instruction cache, wherein said decoder is configured to identify at least one of said plurality of processing elements to execute each one of said plurality of instructions, and wherein said decoder is further configured to identify source and destination operands corresponding to each one of said plurality of instructions;

a dependency checking unit configured to identify dependencies between said plurality of instructions, wherein said dependency checking unit is coupled to receive said source and destination operands from said decoder; and an interconnect control unit coupled to said control bus, said dependency checking unit, and said decoder, wherein said interconnect control unit generates said control signals according to indications of identified processing elements from said decoder and indications of dependencies from said dependency checking unit.

10. The microprocessor as recited in claim 9 wherein said dependency checking unit identifies dependencies by identifying one of said plurality of processing elements which produces a result having a destination equal to a source operand of one of said plurality of instructions.

11. A method for dynamically configuring a plurality of processing elements to execute a plurality of instructions, comprising:

fetching said plurality of instructions from an instruction cache;

assigning each one of said plurality of instructions to at least one of said plurality of processing elements;

detecting a dependency between a first one of said plurality of instructions and a second one of said plurality of instructions;

configuring a data interconnect which connects output buses of said plurality of processing elements to input buses of said plurality of processing elements such that an output bus of one of said plurality of processing elements which receives said first one of said plurality of instructions is connected to an input bus of another one of said plurality of processing elements which receives said second one of said plurality of instructions; and dispatching said plurality of instructions subsequent to said configuring.

12. The method as recited in claim 11 wherein said assigning comprises recording said ones of said plurality of processing elements to which said ones of said plurality of instructions are assigned.

13. The method as recited in claim 12 further comprising fetching a second plurality of instructions.

14. The method as recited in claim 13 further comprising assigning each one of said second plurality of instructions to one of said plurality of processing elements which is not assigned to one of said first plurality of instructions.

15. The method as recited in claim 14 further comprising recording a destination of each of said plurality of instructions.

16. The method as recited in claim 15 further comprising detecting dependencies between said plurality of instructions and said second plurality of instructions using said recorded destinations.

* * * * *